Feb. 11, 1930.   H. W. LANGBEIN   1,746,780
BRAKE TESTING MACHINE
Filed Oct. 29, 1925   2 Sheets-Sheet 1
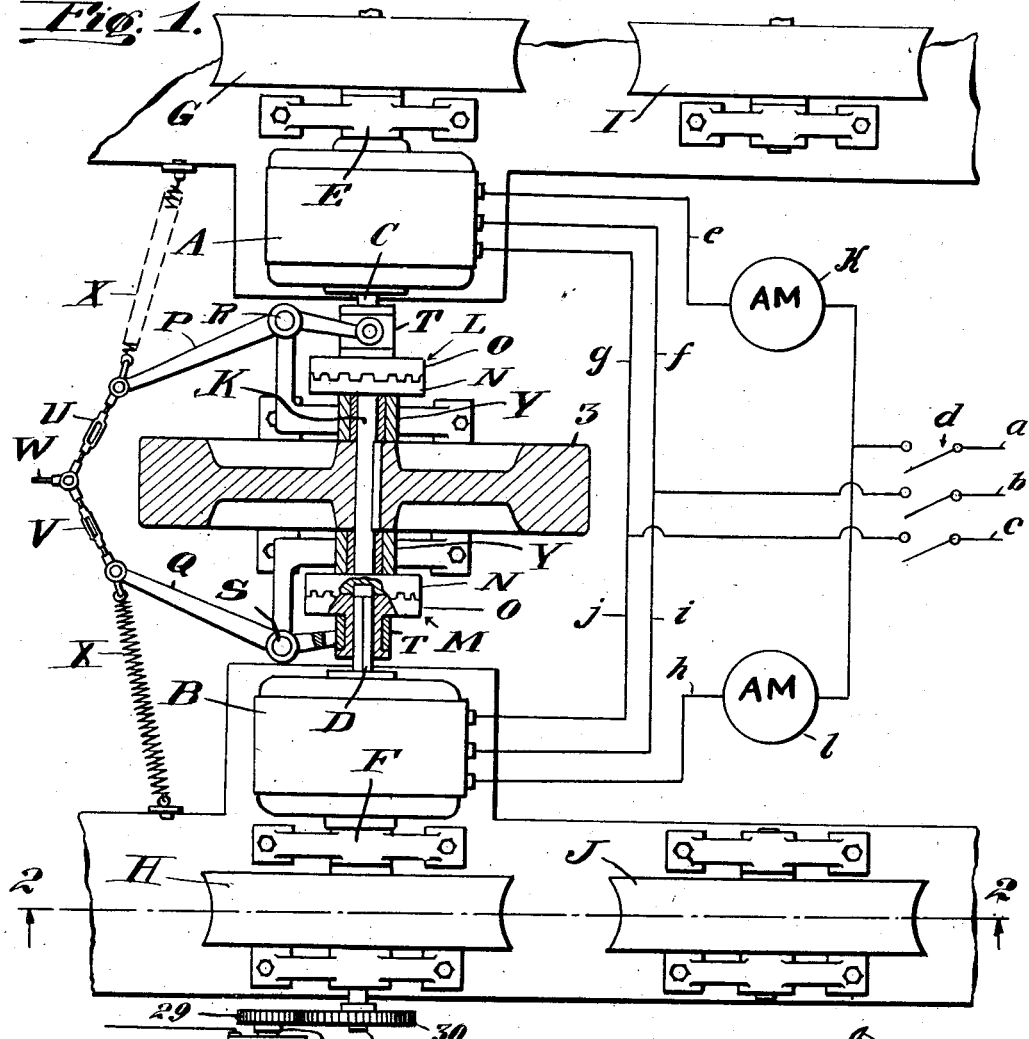
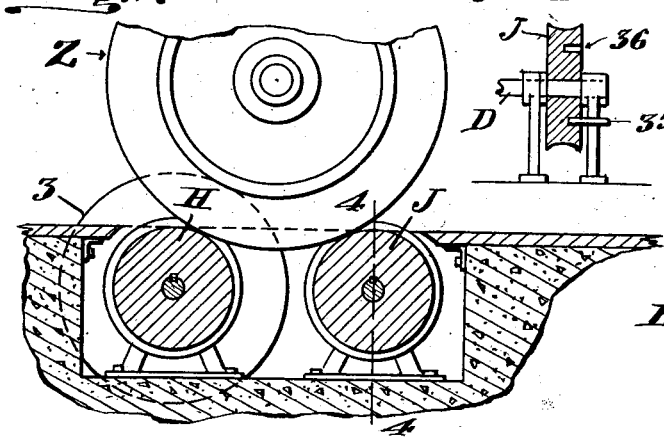
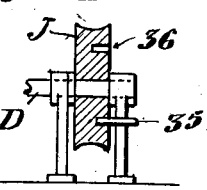
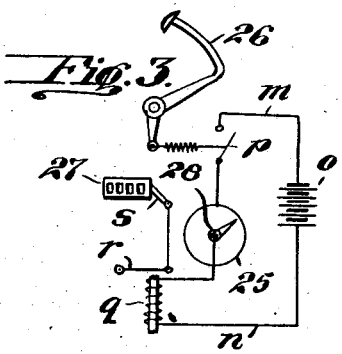
Inventor
Harold W. Langbein
By R. S. Burry
Attorney Feb. 11, 1930. H. W. LANGBEIN 1,746,780
BRAKE TESTING MACHINE
Filed Oct. 29, 1925  2 Sheets-Sheet 2

Patented Feb. 11, 1930

1,746,780

UNITED STATES PATENT OFFICE

HAROLD W. LANGBEIN, OF LOS ANGELES, CALIFORNIA, ASSIGNOR TO BRAKE SYN-CHROMETER CO., OF BOSTON, MASSACHUSETTS, A CORPORATION OF MASSACHU-SETTS

BRAKE-TESTING MACHINE

Application filed October 29, 1925. Serial No. 65,604.

This invention particularly pertains to a device for facilitating adjustment of the brakes of motor vehicles and has as its primary object the provision of a means whereby the relative brake pressures of a plurality of vehicle brakes simultaneously applied may be ascertained to the end of enabling any adjustments of one or more of the brakes as may be necessary in order to establish equalization of brake pressures.

Another object is to provide a means whereby the relative braking effect of at least two vehicle brakes may be coincidently determined with a high degree of accuracy, and whereby the braking action may be readily tested without the necessity of road tests as is now generally practiced.

Another object is to provide a brake testing mechanism by means of which the braking action on the wheels of a vehicle may be ascertained while the vehicle is stationarily supported in a rack, both as to equalization of brake pressures on two or more wheels, and as to the set of the brakes in effecting stopping of the vehicle in a predetermined distance of travel on the full application of the brake with the vehicle moving at a given speed.

A further object is to provide a brake testing mechanism of the above character which is simple in construction, efficient in operation, which is not liable to get out of order, and which will enable rapid determination of braking operations in such manner as to effect a great economy and saving of time in accomplishing proper adjustment of the brakes.

With the foregoing objects in view, together with such other objects and advantages as may subsequently appear, the invention resides generally in the provision of a rack embodying rollers on which the wheels of a vehicle may be supported, together with separate and independent sources of power for coincidently propelling at least two brake-equipped wheels of a vehicle together with independent means actuated by said separated sources of power for indicating the resistance or load imposed on the wheels by the application of their brakes, and also resides in a construction whereby the sources of power may be thrown out of operation and the apparatus utilized in part in determining the effective braking action of the vehicle brakes in bringing the vehicle to rest from a predetermined speed.

The electrical method of testing the brakes is claimed in my copending divisional application Serial No. 221,955 filed Sept. 26, 1927. The electrical means for testing the vehicle brakes is claimed in my copending application Serial No. 192,272, filed May 18, 1927, which is a continuation in part of the present application and in my co-pending divisional application Serial No. 367,732, filed June 1, 1929.

The invention further resides in the parts and in the construction, combination and arrangement of parts hereinafter described and claimed, and illustrated by way of example in the accompanying drawings, in which:—

Fig. 1 is a plan view depicting a preferred embodiment of the invention with parts shown in horizontal section and with portions thereof shown diagrammatically;

Fig. 2 is a detail in vertical section as seen on the line 2—2 of Fig. 1;

Fig. 3 is a diagrammatic view of an appliance for indicating the effective brake action in stopping the vehicle;

Fig. 4 is a detail in section as seen on the line 4—4 of Fig. 2;

Figure 5:
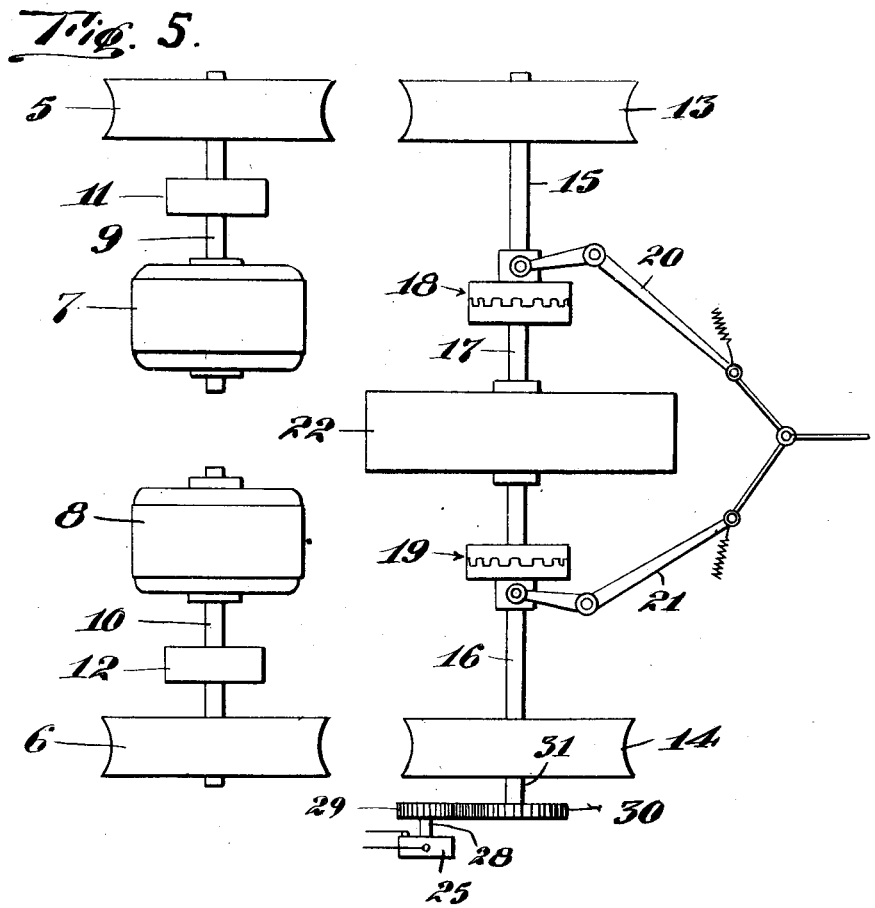
Fig. 5 is a diagrammatic plan view illustrating a modification of the invention.

Referring to the drawings more specifically, A and B (Fig. 1) indicate a pair of electric motors constituting two independent sources of power. The drive shafts C and D of the motors are aligned and passed through bearings E and F and carry rollers G and H; the motors A and B being interposed between the rollers and the rollers G and H being spaced apart horizontally a distance corresponding to the regulation span of the wheels of a motor vehicle. The rollers G and H are adapted to be driven independently by the motors A and B. Arranged in alignment with the rollers G and H are corresponding idling rollers I and J journalled in suitable bearings and spaced from the rollers G and H, respectively. The pairs of rollers G and I, and H and J, are arranged to support the wheels Z of a motor vehicle as shown in Fig. 2, and as a means for affording a run on the rollers for the vehicle wheels, the peripheries of the rollers are concave.

The motors A and B are complementary and are preferably of the three phase type and are connected to the usual conductors in an electrical circuit; the motors A and B being arranged in parallel relation and being operated by electrical current from a common source passing through leads $a$, $b$ and $c$, fitted with the usual switch $d$, which leads connect with the motor A through conductors $e$, $f$ and $g$ and with the motor B through conductors $h$, $i$ and $j$.

In carrying out the invention, ammeters indicated at $k$ and $l$ are arranged in the conductors $e$ and $h$, respectively, independently for indicating the load imposed on the motors A and B.

In the form of the invention illustrated in Fig. 1, the drive shafts C and D of the motors A and B are adapted to be placed in and out of interconnection through the medium of a shaft K extending in alignment with the shafts C and D between which shaft K and shafts C and D is interposed suitable clutches L and M of the positive type. Each clutch is here shown as embodying a member N fixed on the shaft K and a member O splined on the motor drive shaft; the members O being adapted to be simultaneously shifted to position them in and out of engagement with the clutch members N by means of operating levers P and Q fulcrumed at R and S having yokes engaging sleeves T carried by the shiftable clutch members O. The outer ends of the levers P and Q are connected by links U and V to a rod W in such manner that a pull on the rod W will rock the levers P and Q in opposition to springs X to effect disengagement of the clutch members.

The shaft K is journalled in spaced bearings Y and fixed on the shaft K between the bearings is a fly wheel 3.

The clutches L and M are disengaged when employing the device in testing the vehicle brakes to ascertain the relative braking effect thereof, in which instance the motors A and B are simultaneously operated to drive the rollers G and H independently. The clutches are engaged to effect a direct connection between the rollers G and H through the motor drive shafts and the shaft K when using the device as a means for determining the action of the brake in stopping a vehicle, in which instance the rollers G and H are driven through the motive power of the vehicle transmitted through the wheels supported on the rollers.

In the form of the invention shown in Fig. 5, a pair of rollers 5 and 6 are driven from independent sources of power indicated at 7 and 8 through the medium of drive shafts 9 and 10, which drive shafts are fitted with dynamometers 11 and 12 of any suitable construction, whereby the loads on the wheels or rollers 5 and 6 may be independently indicated. A pair of rollers 13 and 14 are arranged in alignment with rollers 5 and 6 and spaced therefrom and are operable independently thereof; the rollers 13 and 14 being fixed on shafts 15 and 16 extending in alignment toward each other and adapted to be disposed in and out of interconnection through the medium of a shaft 17 and clutches 18 and 19 interposed between the shaft 17 and the shafts 15 and 16. The clutches 18 and 19 are adapted to be coincidently thrown in and out of their engaged postion by means of levers 20 and 21. The shaft 17 is fitted with a fly wheel 22.

In each of the forms of the invention shown, means are provided for enabling the determination of the distance at which a vehicle travels after the full application of the brakes before coming to rest, which means is illustrated diagrammatically in Fig. 3 and includes a timer 25 arranged in an electrical circuit including conductors leading from the opposite sides of a battery O.

Arranged in the conductor $m$ is a switch adapted to be connected with the brake lever 26 of the motor vehicle being tested and adapted to close on operation of the brake lever to apply the brake. Arranged in the conductor $n$ is an electromagnet $q$ adapted on being energized to attract an armature $r$ so that connecting impulses controlled by the timer 25 may be indicated. The timer 25 includes a drive shaft 28 fitted with a pinion 29 meshing with a gear 30 on a shaft 31 formed in continuation of the motor drive shaft D carrying the roller 8, as shown in Fig. 1, or in continuation of the shaft 16 carrying the roller 14, as shown in Fig. 5 whereby the gear 30 may be driven to actuate the timer when the rollers are impelled by driving the vehicle wheels supported thereon.

In the operation of the preferred embodiment of the invention shown in Fig. 1 to effect testing of the brakes of a vehicle, the vehicle is positioned with its brake-carrying wheels supported on the rollers G, I, H and J with the vehicle clutch mechanism disposed in neutral. The clutches L and M are then thrown out of engagement and the motors A and B set in operation by closing the switch $d$ thereby effecting independent driving of the rollers G and H and of the vehicle wheels supported thereon. By applying the vehicle brakes the movement of the vehicle wheels will be retarded thereby effecting a drag on the rollers G and H and imposing increased loads on the motors A and B, which loads will be indicated by the ammeters $k$ and $l$.

In event the braking effects of the vehicle brakes are equal, the load on the motors A and B will be equal, and accordingly, the readings of the ammeters will correspond, thus indicating to the observer that the pair of brakes being thus tested are of equal braking action. In event of any inequality of the braking effect of either of the brakes being tested there will be a variance in the load imposed on the motors A and B which variance will be indicated by the ammeters so that the operator may make the proper adjustments to the end of equalizing the brake actions. In this manner proper relative adjustment of the brakes may be easily and quickly effected.

In like manner, in the operation of the embodiment of the invention shown in Fig. 5 the clutches 18 and 19 are thrown out of engagement so that the rollers 13 and 14 may be idle relative to each other whereupon on setting the motors 7 and 8 in operation the relative effect of the vehicle brakes may be ascertained.

It will be understood that the motors are balanced in regard to speed and current so that the readings of the ammeters will correspond on subjecting the motors to corresponding loads.

It will be observed that the impelling rollers are connected directly to the motor driven shafts. This serves to minimize variations due to friction or lost motion and thus insure a high degree of accuracy in effecting tests.

In the operation of the invention to determine the effectiveness of the brakes in stopping movement of a vehicle travelling a predetermined speed and to ascertain the distance traversed by the vehicle after full application of its brakes, the clutches L and M in the arrangement shown in Fig. 1, or the clutches 18 and 19 in the arrangement shown in Fig. 5, are disposed in engagement so as to effect a positive connection between opposite rollers and to dispose the fly wheel in the connection. The wheels of the motor vehicle resting on the rollers are then set in motion by operation of the vehicle motor, and are brought up to a predetermined speed according to indications of the vehicle speedometer, whereupon the vehicle brakes are fully applied by operation of the brake lever 26. The application of the vehicle brakes retards rotation of the vehicle wheels and acts through the vehicle wheels to retard rotation of the rollers G and H and finally the flywheel 3. The flywheel 3, by reason of its weight and momentum or kinetic energy at a given speed will thus serve, as a means of affording the equivalent of momentum or kinetic energy of a vehicle when traversing a roadway, at a given speed so that in testing the effectiveness of the vehicle brakes in bringing the vehicle to a stop substantially the same condition will be created in the testing machine as would be present in making a road test. This operation of the brake lever closes the switch $p$ so that the timer 25 (which is being rotated from the roller being driven by the vehicle wheels) will effect a make and break of the electrical circuit through the solenoid $q$ so that the latter will be energized intermittently and be caused to actuate the counter 27 on each revolution of the timer 25. When the application of the brakes results in stopping the vehicle wheels, driving of the timer will also be discontinued so that the operator, by referring to the counter 27, may calculate the peripheral distance traversed by the vehicle wheels which distance represents the lineal distance of travel that would have been traversed by the vehicle in a road test. In determining this distance of travel the diameter of the vehicle wheels and the weight of the vehicle will be taken into consideration together with the indications of the counter 27 according to a suitable chart.

It will be understood that in thus testing vehicles having wheels of different diameters gears 29 and 30 of proper relative diameters in relation to the diameter of the vehicle wheel will be employed.

As a means for facilitating removing the vehicle from its position on the rollers, means are provided whereby opposite rollers may be locked against rotation which is here shown as accomplished by inserting pegs 35 in openings 36 formed in the side faces of the rollers, as shown in Fig. 4, in such manner that the pegs will project in front of the roller supports to limit their rotation.

While I have shown and described the specific embodiment of my invention, I do not limit myself to the exact details of construction and arrangement shown but may employ such changes and modifications as come within the spirit and scope of the invention as set forth in the appended claims.

I claim:—

1. In a brake testing apparatus for a vehicle having a wheel and a brake therefor, the combination of a rotatable wheel, means for supporting the same in position to be driven with said vehicle wheel at substantially the same peripheral speed as the vehicle wheel, a tachometer, and means actuated by the vehicle brake for operatively connecting said tachometer and said rotatable wheel during the operation of the brake on the vehicle wheel.

2. In a brake testing apparatus for a vehicle having a wheel and a brake therefor, the combination of a rotatable wheel, means for supporting the same in position to be driven with said vehicle wheel at substantially the same peripheral speed as the latter, a tachometer adapted to be connected to said rotatable wheel, and means for automatically controlling the operation of the tachometer from the vehicle brake.

3. In an apparatus of the class described, the combination with revoluble means for receiving kinetic energy, said revoluble means being adapted for connection to the wheels of the vehicle, the brakes of which are to be tested, so as to be stopped by the vehicle wheel brakes, mechanism normally inoperative for measuring the movement of said revoluble means, and means adapted to be connected with the brake operating mechanism of the vehicle for rendering said normally inoperative mechanism operative by the application of the vehicle brakes.

4. In a brake and differential testing device for vehicles, a pair of drums, means to mount the drums for independent rotation, rotatable inertia means, means to drive the inertia means from the drums, said drums being positioned to receive a pair of vehicle wheels thereon, whereby one pair may be driven from another.

5. In a brake and differential testing device for vehicles, a pair of drums, means to mount the drums for independent rotation, means operable at will to couple the drums to rotate simultaneously, rotatable inertia means, and means to drive the inertia means from the drums, said drums being positioned to receive a pair of the vehicle wheels thereon, whereby one pair may be driven from another.

In testimony whereof, I have affixed my signature.

HAROLD W. LANGBEIN.